United States Patent
Pietraski et al.

(10) Patent No.: US 8,265,130 B2
(45) Date of Patent: *Sep. 11, 2012

(54) ADAPTIVE EQUALIZER WITH A DUAL-MODE ACTIVE TAPS MASK GENERATOR AND A PILOT REFERENCE SIGNAL AMPLITUDE CONTROL UNIT

(75) Inventors: Philip J. Pietraski, Huntington Station, NY (US); Mihaela C. Beluri, Huntington, NY (US); Alpaslan Demir, East Meadow, NY (US); Jung-Lin Pan, Smithtown, NY (US); Gregory S. Sternberg, Mt. Laurel, NJ (US); Rui Yang, Greenlawn, NY (US); Bin Li, Shenzhen (CN)

(73) Assignee: InterDigital Technology Corporation, Wilmington, DE (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/512,203

(22) Filed: Jul. 30, 2009

(65) Prior Publication Data

US 2009/0290630 A1    Nov. 26, 2009

Related U.S. Application Data

(63) Continuation of application No. 11/265,373, filed on Nov. 2, 2005, now Pat. No. 7,570,690.

(60) Provisional application No. 60/625,188, filed on Nov. 5, 2004.

(51) Int. Cl.
*H03H 7/40* (2006.01)
*H03K 5/159* (2006.01)

(52) U.S. Cl. ......... 375/229; 375/219; 375/295; 375/316

(58) Field of Classification Search .......... 375/229–236, 375/219, 226, 240.26–240.29, 284–285, 375/345, 350, 354–355, 220, 221, 295, 316, 375/296, 346, 343, 340

See application file for complete search history.

(56) References Cited

U.S. PATENT DOCUMENTS

| | | | |
|---|---|---|---|
| 4,743,864 A | 5/1988 | Nakagawa et al. | |
| 5,091,956 A | 2/1992 | Miki | |
| 5,159,282 A | 10/1992 | Serizawa et al. | |
| 5,200,977 A | 4/1993 | Ohnishi | |

(Continued)

FOREIGN PATENT DOCUMENTS

EP    1 160 981    12/2001

(Continued)

*Primary Examiner* — Sam K An
*Assistant Examiner* — Linda Wong
(74) *Attorney, Agent, or Firm* — Volpe and Koenig, P.C.

(57) ABSTRACT

An adaptive equalizer including an equalizer filter and a tap coefficients generator used to process a sample data stream derived from a plurality of received signals is disclosed. The tap coefficients generator includes an equalizer tap update unit, a vector norm square estimator, an active taps mask generator, a switch and a pilot amplitude reference unit used to minimize the dynamic range of the equalizer filter. A dynamic mask vector is used to mask active taps generated by the equalizer tap update unit when an unmasked signal output by the equalizer filter is selected by the switch to generate an error signal fed to the equalizer tap update unit. A fixed mask vector is used to mask active taps generated by the equalizer tap update unit when a masked signal output by the equalizer filter is used to generate the error signal.

10 Claims, 9 Drawing Sheets

U.S. PATENT DOCUMENTS

| | | |
|---|---|---|
| 5,572,558 A | 11/1996 | Beherns |
| 5,664,595 A | 9/1997 | Vonderhorst et al. |
| 5,940,450 A | 8/1999 | Koslov et al. |
| 5,974,434 A | 10/1999 | Rose |
| 6,134,260 A | 10/2000 | Bottomley et al. |
| 6,275,330 B1 * | 8/2001 | Izumi .................. 359/341.42 |
| 6,400,758 B1 | 6/2002 | Goldston et al. |
| 6,510,187 B2 | 1/2003 | Saito et al. |
| 6,577,690 B1 | 6/2003 | Barman et al. |
| 6,731,745 B1 | 5/2004 | Goto |
| 6,904,098 B1 | 6/2005 | Isaksen et al. |
| 7,274,727 B2 | 9/2007 | Nakayama |
| 2001/0008543 A1 | 7/2001 | Tanada |
| 2002/0024996 A1 | 2/2002 | Agazzi et al. |
| 2002/0045433 A1 | 4/2002 | Vihriala |
| 2002/0114385 A1 | 8/2002 | Gu et al. |
| 2002/0196866 A1 | 12/2002 | Diehl et al. |
| 2003/0086366 A1 | 5/2003 | Branlund et al. |
| 2003/0103588 A1 | 6/2003 | Tanada et al. |
| 2003/0231708 A1 * | 12/2003 | Kim et al. .................. 375/232 |
| 2004/0101068 A1 | 5/2004 | Wang et al. |
| 2004/0127164 A1 | 7/2004 | Mondragon-Torres et al. |
| 2004/0161066 A1 | 8/2004 | Hwang et al. |
| 2005/0232347 A1 | 10/2005 | Chang |
| 2005/0243955 A1 | 11/2005 | Mondragon-Torres et al. |

FOREIGN PATENT DOCUMENTS

| | | |
|---|---|---|
| EP | 1 336 254 | 8/2003 |
| GB | 2389283 | 12/2003 |
| JP | 03-230649 | 10/1991 |
| JP | 03230649 | 10/1991 |
| JP | 03-245628 | 11/1991 |
| JP | 06-237147 | 8/1994 |
| JP | 07-086993 | 3/1995 |
| JP | 2001-177451 | 6/2001 |
| JP | 2002-217776 | 8/2002 |
| KR | 1998-064798 | 1/1998 |
| TW | 317677 | 10/1997 |
| TW | 384582 | 3/2000 |
| TW | 428309 | 4/2001 |
| WO | 02/082758 | 10/2002 |

* cited by examiner

ADAPTIVE EQUALIZER WITH A DUAL-MODE ACTIVE TAPS MASK GENERATOR AND A PILOT REFERENCE SIGNAL AMPLITUDE CONTROL UNIT

CROSS REFERENCE TO RELATED APPLICATION

This application is a continuation of U.S. patent application Ser. No. 11/265,373, filed Nov. 2, 2005, which claims the benefit of U.S. Provisional Patent Application No. 60/625, 188, filed Nov. 5, 2004, which is incorporated by reference as if fully set forth.

FIELD OF INVENTION

The present invention is related to an adaptive equalizer used in a normalized least mean square (NLMS) chip-level equalization (CLE) receiver. More particularly, the present invention relates to a pilot amplitude reference unit which controls the output power of the adaptive equalizer, and an active taps reference unit which generates an active taps mask when either a static filter tap masking mode or a dynamic filter tap masking mode is implemented.

BACKGROUND

An adaptive equalizer based receiver, such as an NLMS-based receiver, provides superior performance for high data rate services such as frequency division duplex (FDD) high speed downlink packet access (HSDPA) or code division multiple access (CDMA) 2000 evolution data voice (EV-DV) over a Rake receiver. A typical NLMS receiver includes an equalizer having an equalizer filter and a tap coefficients generator. The equalizer filter is typically a finite impulse response (FIR) filter. The tap coefficients generator in the equalizer generates appropriate tap coefficients for the equalizer filter and uses an NLMS algorithm to update the tap coefficients appropriately and iteratively in a timely basis. The NLMS algorithm attempts to converge to a minimum mean square error (MMSE) solution by iteratively updating the tap coefficient weights such that, on average, they approach the MMSE solution.

Typically, an error signal computation, a vector norm calculation and leaky integration is required to generate and update the tap coefficients. When the optimal equalizer filter tap coefficients contain one or more zero values, it would be desirable to effectively remove some of the taps from the equalizer filter by masking the taps, rather than having the NLMS algorithm try to set the tap values to zero. The NLMS algorithm can only make the tap values small since there is always some noise perturbing the system and because step sizes cannot be made small in time varying channels. By masking the taps, the overall performance of the adaptive equalizer based receiver would be improved, especially when small delay spread channels or sparse channels are encountered.

SUMMARY

The present invention is related to an adaptive NLMS CLE receiver which includes an adaptive equalizer having an equalizer filter and a tap coefficients generator used to process a sample data stream derived from a plurality of received signals. The tap coefficients generator includes an equalizer tap update unit, a vector norm square estimator, an active taps mask generator, a switch and a pilot amplitude reference unit used to minimize the dynamic range of the equalizer filter. A dynamic mask vector is used to mask active taps generated by the equalizer tap update unit when an unmasked signal output by the equalizer filter is selected by the switch to generate an error signal fed to the equalizer tap update unit. A fixed mask vector is used to mask active taps generated by the equalizer tap update unit when a masked signal output by the equalizer filter is used to generate the error signal.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
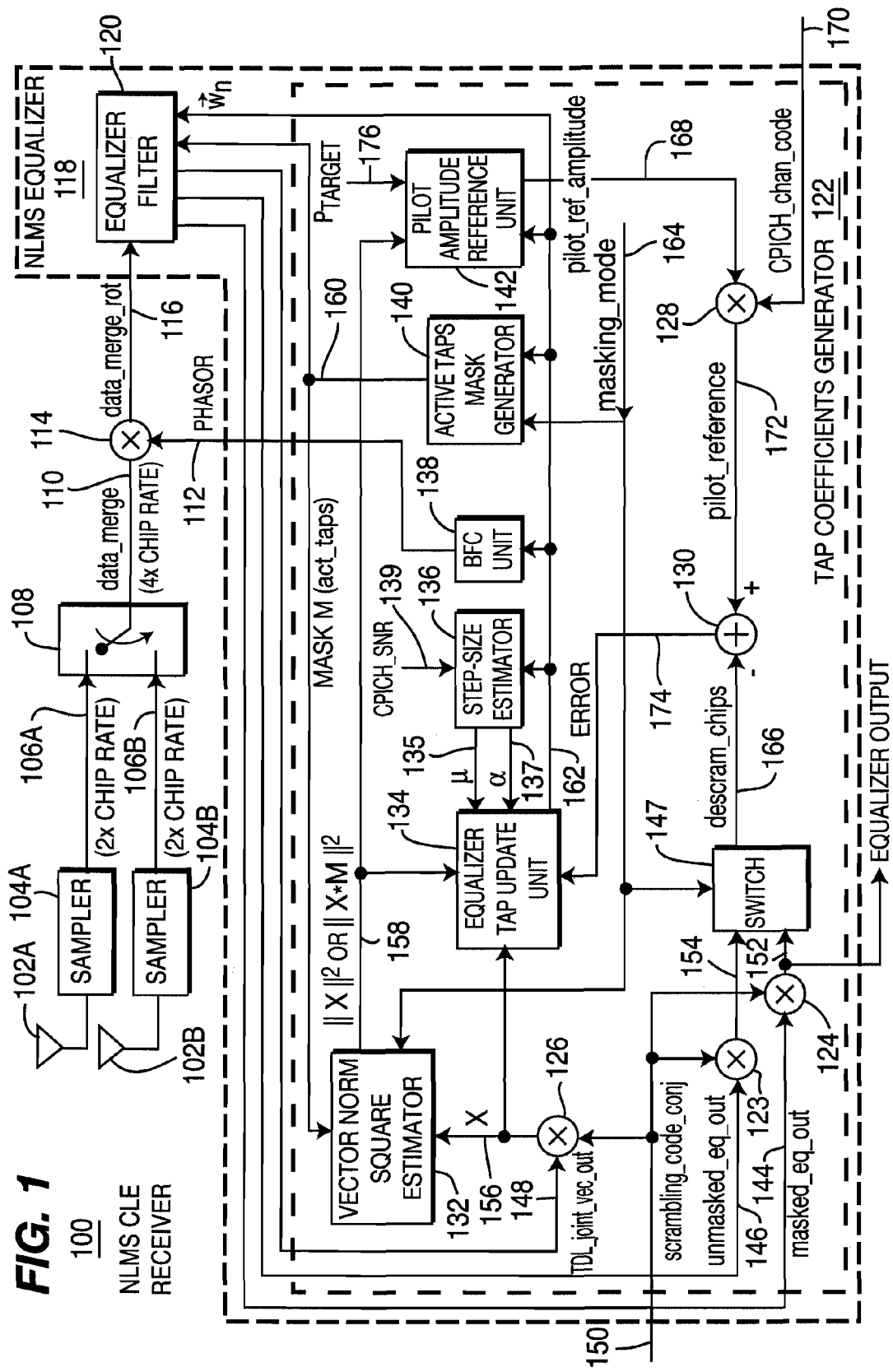
FIG. 1 is a high-level block diagram of an exemplary NLMS CLE receiver configured in accordance with one embodiment of the present invention.

The preferred embodiments will be described with reference to the drawing figures where like numerals represent like elements throughout.

When referred to hereafter, the terminology "wireless transmit/receive unit" (WTRU) includes but is not limited to a user equipment (UE), a mobile station, a fixed or mobile subscriber unit, a pager, or any other type of device capable of operating in a wireless environment.

When referred to hereafter, the terminology "transceiver" includes but is not limited to a base station, a WTRU, a Node-B, an access point (AP) or any other wireless communication device that receives signals from and transmits signals to another transceiver.

When referred to hereafter, the terminology "apparent channel speed" and "apparent speed of a channel" includes but is not limited to the observed and/or measured rate of change of an impulse response of a channel established between a first transceiver (e.g., WTRU, base station, or the like), and at least one other transceiver. The change of the channel impulse response may be caused by the movement of one or more of the transceivers, oscillator errors that occur in at least one of the transceivers, and the movement of objects in the environment in which at least one of the transceivers operates.

The features of the present invention may be incorporated into an integrated circuit (IC) or be configured in a circuit comprising a multitude of interconnecting components.

Hereafter, the present invention will be explained with reference to methods of receiver diversity for an NLMS algorithm. However, the NLMS algorithm is used as an example, and any other adaptive equalization or filtering algorithm, such as least mean square (LMS), Griffith's algorithm, channel estimation based NLMS (CE-NLMS), and other iterative or recursive algorithms may be used.

FIG. 1 is a high-level block diagram of an exemplary NLMS CLE receiver 100 configured in accordance with the present invention. The NLMS CLE receiver 100 is a joint processing NLMS receiver which uses a single adaptive equalizer filter 120. The NLMS CLE receiver 100 includes a plurality of antennas 102A, 102B, a plurality of samplers 104A, 104B, a multiplexer 108, a multiplier 114 and an NLMS equalizer 118. The NLMS equalizer 118 includes the equalizer filter 120 and a tap coefficients generator 122.

As shown in FIG. 1, signals received by the antennas 102A, 102B are respectively input into the samplers 104A, 104B for generating respective sample data streams 106A, 106B which are sampled at two times (2×) the chip rate. The sample data streams 106A, 106B are merged by the multiplexer 108 into a single sample data stream 110 which is fed to a first input of the multiplier 114. Since samples occur at twice the chip rate on each of the sample data streams 106A, 106B, samples will occur at 4 times (4×) the chip rate on the sample data stream 110. Each sample that occurs on the sample data stream 110 originated from either sample data stream 106A or 106B. The effective rate of the equalizer filter 120 is four times (4×) the chip rate.

Although FIG. 1 illustrates the NLMS CLE receiver 100 as being capable of sampling signals received from two (2) antennas at twice (2×) the chip rate, it should be noted that the NLMS CLE receiver 100 may comprise any number of antennas and the signals received by the antennas may be sampled at any desired rate.

The equalizer filter 120 of the NLMS equalizer 118 comprises a plurality of taps with filter coefficients. A FIR filter may be utilized as the equalizer filter 120. The number of taps in the equalizer filter 120 may be optimized for specific multipath channels of different power-delay profiles and vehicle speeds. The tap coefficients generator 122 includes a vector norm square estimator 132, an equalizer tap update unit 134, a step-size estimator 136, a BFC unit 138, an active taps mask generator 140, a pilot amplitude reference unit 142, a switch 147, multipliers 123, 124, 126, 128, and an adder 130.

The BFC unit outputs a rotating phasor which is fed to a second input of the multiplier 114 to correct the frequency of the sample data stream 110, which will be explained in detail below with reference to FIGS. 2 and 3. The multiplier 114 generates a frequency corrected sample data stream 116 which is fed to an input of the equalizer filter 120 in the NLMS equalizer 118.

Still referring to FIG. 1, the equalizer filter 120 outputs a masked equalizer output (masked_eq_out) signal 144 which is provided when active tap masking is implemented, an unmasked equalizer output, (unmasked_eq_out), signal 146 which is provided when active tap masking is not implemented, and an equalizer tapped delay line (TDL), (TDL_joint_vec_out), signal 148 which is always provided.

The masked equalizer output signal 144 is a chip rate signal that is multiplied with a scrambling code conjugate, (scrambling_code_conj), signal 150 via the multiplier 124 to generate a descrambled masked equalizer output signal 152 (i.e., an estimate of the unscrambled transmitted chips), which is fed to a first input of the switch 147. The unmasked equalizer output signal 146 is multiplied with the scrambling code conjugate signal 150 via the multiplier 123 to generate a descrambled unmasked equalizer output error signal 154 which is fed to a second input of the switch 147.

The equalizer TDL signal 148 is multiplied with the scrambling code conjugate signal 150 via the multiplier 126 to generate a vector signal 156 having a value X (i.e., a descrambled equalizer TDL signal). The vector signal 156 is input to the vector norm square estimator 132 and to a first input of the equalizer tap update unit 134. The vector norm square estimator 132 generates a vector normalization signal 158. The vector norm square estimator 132 feeds the vector normalization signal 158 to a second input of the equalizer tap update unit 134 and to the pilot amplitude reference unit 142.

Still referring to FIG. 1, when the active taps mask generator 140 is in a dynamic filter tap masking mode, the vector norm square estimator 132 generates a vector normalization signal 158 having a value which is equal to the norm squared of the value X of the vector signal 156, $\|X\|^2$, or equivalently the equalizer TDL signal 148). When the active taps mask generator 140 is in a static filter tap masking mode, the vector norm square estimator 132 generates a vector normalization signal 158 having a value which is equal to the norm of the value X of the vector signal 156 element-wise multiplied by M, $\|X \times M\|^2$, where M is an active taps mask.

A masking mode signal 164 is fed to the active taps mask generator, the switch 147 and the vector norm square estimator 132. The masking mode signal 164 indicates whether the dynamic or static filter tap masking mode is being used. When the masking mode signal 164 indicates that the static filter tap masking mode is being used, the switch 147 selects signal 152 as a selected output signal 166 to be fed to a first input of the adder 130. When the masking mode signal 164 indicates that the dynamic filter tap masking mode is being used, the switch 147 selects signal 154 as the selected output signal 166. The configuration of the active taps mask generator 140 is described in further detail below with respect to FIGS. 5 and 6.

A pilot reference amplitude signal 168 generated by the pilot amplitude reference unit 142 is used to adjust the average output power of the NLMS equalizer 118 by changing the amplitude of a pilot reference signal 172, which is generated by the multiplier 128 multiplying the pilot reference amplitude signal 168 with a scaled pilot (i.e., common pilot channel (CPICH)), channelization code 170. The pilot reference amplitude signal 168 is derived based on the vector normalization signal 158, the equalizer filter tap coefficients 162 and a power target signal 176. The pilot reference signal 172 is input to a second input of the adder 130. The pilot amplitude reference unit 142 is further described in further detail below with reference to FIG. 7.

The selected output signal 166 is subtracted from the pilot reference signal 172 by the adder 130 to generate an error signal 174 which is input to a third input of the equalizer tap update unit 134. The external signals 150 and 170 are configured and generated based on information signaled from higher layers.

Based on the signals 156, 158, 135, 137, and 174, the equalizer tap update unit 134 generates equalizer filter tap coefficients 162 which are input to the equalizer filter 120, the step-size estimator 136, the BFC unit 138, the active taps mask generator 140 and the pilot amplitude reference unit 142.

Based on the equalizer filter tap coefficients 162, the active taps mask generator 140 generates an active taps mask vector 160 which is fed to the vector norm square estimator 132 and the equalizer filter 120.

The equalizer filter tap coefficients 162 represent the tap values used by the equalizer filter 120. At a given time, the equalizer filter tap coefficients 162 are computed based on the current value of the equalizer filter tap coefficients 162, the vector signal 156, the vector normalized signal 158, the error signal 174, and a step-size, μ ("mu"), parameter 135 and filter taps leakage factor, α ("alpha"), parameter 137 provided by the step-size estimator 136 based on a CPICH signal-to-noise ratio (SNR) input 139 which will be explained in detail below with reference to FIG. 4. A more detailed description of updating the equalizer filter tap coefficients 162 is provided below.

The error signal 174 is either based on the descrambled masked equalizer output signal 152 or the descrambled unmasked equalizer output signal 154. The descrambled masked equalizer output signal 152 is used as the selected output signal 166 when the active taps algorithm in the active taps mask generator 140 is not dynamically updating the active taps mask (i.e., the static filter tap masking mode). The descrambled unmasked equalizer output signal 154 is used as the selected output signal 166 when the active taps algorithm in the active taps mask generator 140 is dynamically updating the taps mask. During the dynamic filter tap masking mode of operation, the active taps algorithm makes decisions on which taps to mask based on the values of the taps. If the descrambled masked equalizer output signal 152 were to be used instead of the descrambled unmasked signal 154 to generate the error signal 174, there would be no feedback mechanism in the active taps algorithm to properly drive the values of the masked taps. Therefore, the active taps algorithm would not function properly. Conversely, during the static filter tap masking mode of operation, the active taps algorithm does not make any changes to the mask so it is insignificant whether the behavior of the masked taps is correct. Thus, it is desired to use the error signal 174 based on the masked equalizer output signal 154 because the equalizer filter tap coefficients 162 will be optimized for generating the taps used to provide the equalizer output signal (i.e., signal 152).

The equalizer filter tap coefficients 162 are updated by the equalizer tap update unit 134 as follows:

$$\vec{w}_n = \alpha \cdot \vec{w}_{n-1} + \mu \frac{\vec{x}^H}{\|\vec{x}\|^2 + \varepsilon} \cdot \text{error}, \quad \text{Equation (1)}$$

where $\vec{w}_n$ is a weight vector defined for the equalizer filter 120, n is an update or time index, $\vec{x}$, $\vec{x}_n^H$ are vectors based on the samples received from the antennas 102A, 102B, μ, α, ε are parameters chosen to control the adaptation step-size, tap leakage, and to prevent division by zero (or near zero) numbers respectively. ε is a small number used to prevent from dividing by zero. The leakage parameter α (alpha) is a weighting parameter, where $0 < \alpha \leq 1$. The step-size parameter μ is a scale factor on the error. The equalizer filter 120 is simply a FIR structure that computes the inner product of $\vec{w}_n$ and $\vec{x}$, $\langle \vec{w}_n, \vec{x} \rangle$. The result of the inner product is the unmasked equalizer output signal 146. The equalizer filter 120 also generates another masked equalizer output signal 144 that includes a mask M when the active taps mask generator 140 is in a static filter tap masking mode. The masked equalizer output signal 144 is computed by first taking the element-wise product of either $\vec{w}_n$ or $\vec{x}$ and then taking the inner product, $\langle w, X*M \rangle$, where w is a particular weight, X is a particular received sample and M is an active taps mask included in the active taps mask vector generated by the active taps mask generator 140. The present invention implements receive diversity in conjunction with an adaptive equalizer, which greatly improves the receiver performance. A joint equalizer filter coefficient vector adaptation scheme in accordance with the present invention is described below. The joint equalizer is formulated in a context without an act_taps mask for clarity. However, that masking may be included in combination with receiver diversity.

A joint weight vector $\vec{w}_{n,joint}$ is defined for the equalizer filter as a union of multiple component weight vectors. Each component weight vector corresponds to data collected by a different antenna. Any permutation of elements from component vectors may comprise the joint weight vector so long as the permutation properly reflects the order in which data enters the joint NLMS equalizer. As these are mathematically equivalent, the permutation may be chosen for notational convenience. For example, for two antennas, the joint weight vector $\vec{w}_{n,joint}$ can be defined as follows:

$$\vec{w}_{n,joint} = [\vec{w}_{n,1}^T, \vec{w}_{n,2}^T]^T, \quad \text{Equation (2)}$$

where $(\ )^T$ denotes a transpose operation. The total number of taps of the equalizer filter is denoted by L. $\vec{w}_{n,joint}$ is a column vector.

For the chosen notation in Equation (2), the notation for the joint update vector $\vec{x}_{n,joint}$ is defined as follows:

$$\vec{x}_{n,joint} = [\vec{x}_n^1, \vec{x}_n^2], \quad \text{Equation (3)}$$

where $\vec{x}_n^1, \vec{x}_n^2$ are vectors based on the samples received from antenna 1 and antenna 2, respectively. $\vec{x}_{n,joint}$ is a row vector.

The filter coefficient adaptation for the joint NLMS equalizer can then be processed in a usual way for an NLMS equalizer. For example, the updated coefficient vector can be obtained as follows:

$$\vec{w}_{n+1,joint} = \alpha \cdot \vec{w}_{n,joint} + \mu \frac{\vec{x}_{n,joint}^H}{\|\vec{x}_{n,joint}\|^2 + \varepsilon} (d[n] - \vec{x}_{n,joint} \vec{w}_{n,joint}), \quad \text{Equation (4)}$$

where $(\ )^H$ denotes a transpose conjugate operation, d[n] is the reference signal for NLMS and ε is a small number used to prevent from dividing by zero. The parameter α is a weighting parameter and μ is a scale factor of error signal. The μ can be estimated based on the channel speed and signal-to-interference and noise ratio (SINR) and interpolated to obtain a continuous estimation.

For pilot-directed NLMS, d[n] can be a pilot signal, training signal, or other known pattern signals, either despread with pre-determined despreading factors or non-despread. Similarly for data-directed NLMS, d[n] can be fully-, partially- or non-despread data symbols. The tap correction terms $\vec{\Delta}_n$ are computed as follows:

$$\vec{\Delta}_n = \mu \frac{\vec{x}_{n,joint}^H}{\|\vec{x}_{n,joint}\|^2 + \varepsilon} \cdot e_{n,joint},$$ Equation (5)

where the factor $e_{n,joint}$ is a joint error signal and is computed by subtracting the equalizer filter output from the reference signal d[n] as follows:

$$e_{n,joint} = d[n] - \vec{x}_{n,joint} \vec{w}_{n,joint}.$$ Equation (6)

The new tap coefficients for the next iteration are obtained by adding the tap correction terms $\vec{\Delta}_n$ to the (possibly weighted to provide leakage) tap coefficients of the previous iteration. The weighting mechanism can be characterized by a parameter α (alpha) formulated as follows:

$$\vec{w}_{n+1} = \alpha \cdot \vec{w}_n + \vec{\Delta}_n.$$ Equation (7)

Figure 2:
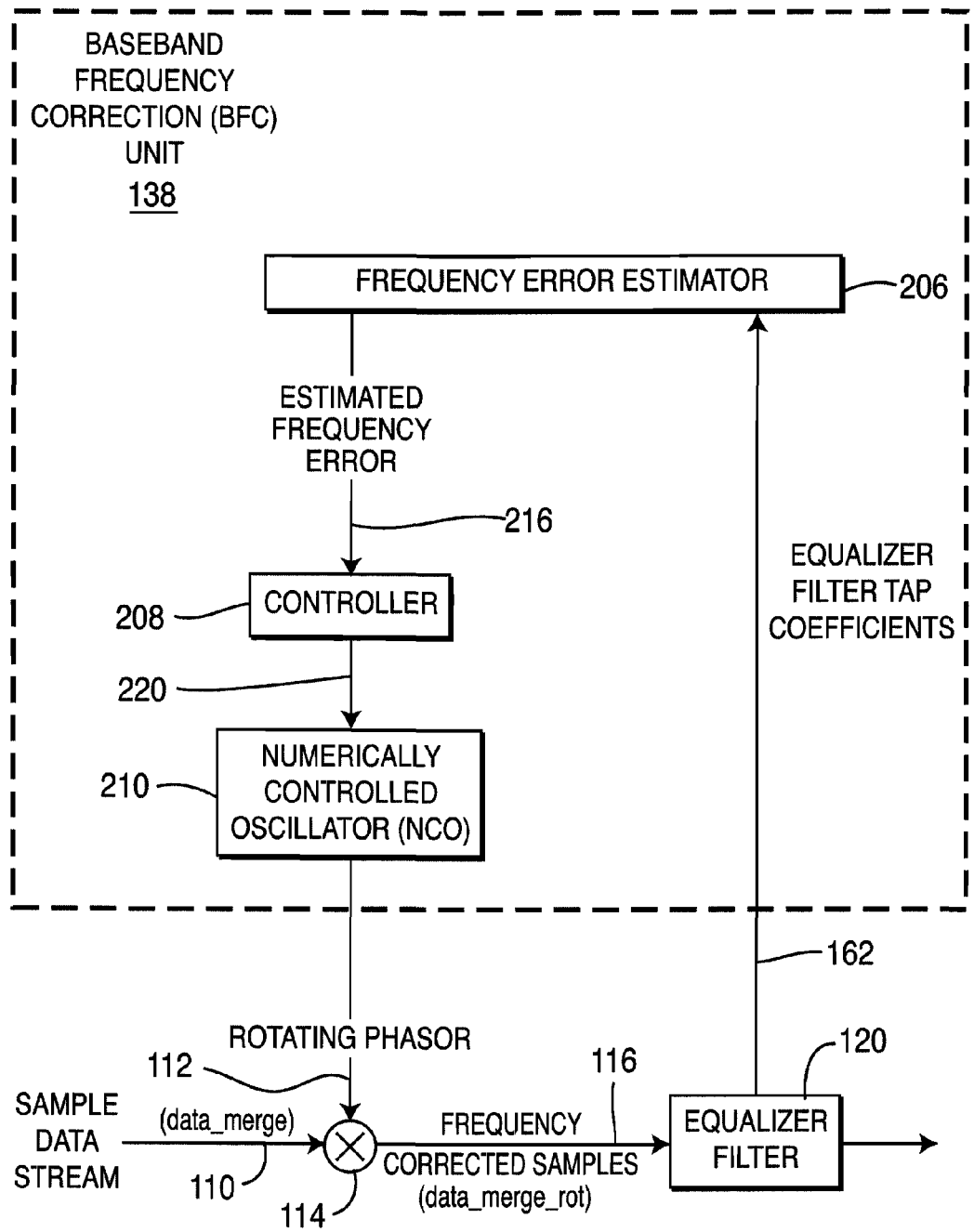
FIG. 2 is a block diagram of a baseband frequency correction (BFC) unit including a frequency error estimator used to remove residual automatic frequency control (AFC) errors in the NLMS CLE receiver of FIG. 1.

FIG. 2 is a block diagram of the BFC unit 138 used to remove residual automatic frequency control (AFC) errors in the NLMS CLE receiver 100 of FIG. 1. The BFC unit 138 includes a frequency error estimator 206, a controller 208 and a numerically controlled oscillator (NCO) 210. The equalizer filter 120 in the NLMS equalizer 118 of the NLMS CLE receiver 100 of FIG. 1 processes the sample data stream 110 via the multiplier 114. The equalizer filter tap coefficients 162 used by the equalizer filter 120 are provided as an input to the frequency error estimator 206. The frequency error estimator 206 generates an estimated frequency error signal 216. The residual frequency errors after AFC can be greatly reduced by BFC based solely on observation of at least one tap value in the equalizer filter 120, a combination of several tap values (e.g, a sum), or alternatively from partial channel estimates, such as a Rake finger complex weight estimation. BFC is accomplished by estimating the frequency error based on observation of the one or more taps in the equalizer filter 120, generating a correction signal consisting of a complex sinusoid (or rotating phasor), correcting the input samples data stream by multiplying it by the phasor and applying frequency corrected samples 116 to the input of the equalizer filter 120 in a closed loop fashion.

The residual frequency error is estimated by periodically measuring the phase change of one or more of the tap values of the equalizer filter 120 (or alternatively, partial channel estimates). Much of the phase change measured on the equalizer filter tap coefficients 162 from sample to sample is due to noise and fading. However, phase changes due to fading and noise are zero mean (e.g., have a mean value of zero). Thus, filtering can be used to reduce the noise and fading components of phase changes from the overall phase changes, and to recover the slowly varying phase change due to the frequency error (residual AFC errors).

Once the frequency error is estimated by the frequency error estimator 206, the controller 208 processes the estimated frequency error signal 216 to generate a frequency adjustment signal 220. The controller 208 may simply provide a gain to the estimated frequency error signal 216 or may process the estimated frequency error signal 216 with a more complicated algorithm (e.g., a proportional-integral-derivative (PID)). The frequency adjustment signal 220 is fed to the NCO 210 which generates a rotating phasor 112. The multiplier 114 multiplies the rotating phasor 112 with the sample data stream 110 to generate the frequency corrected samples 116 input into the equalizer filter 120.

Residual AFC errors manifest themselves in the baseband as a multiplicative error in the baseband signal and has the form of a complex sinusoid, such as g(t)*exp(j*2pi*f*t) where g(t) is the desired uncorrupted baseband signal and exp(j*2pi*f*t) is the complex sinusoid representing the error. By multiplying by exp(−j*2pi*f*t), the complex sinusoids cancel leaving only the desired signal g(t). The estimated frequency error signal 216 is input to the controller 208 which, in turn, outputs a signal 220 which may be, for example, a scaled (i.e., proportional) version of the input, e.g., four (4) times the value of the estimated frequency error signal 216. The output signal 220 of the controller 208 may also include other terms such as a term proportional to the integrals and/or derivatives of the estimated frequency error signal 216. More generally, the output signal 220 could also be clipped to be within some range or have other such non-linear function applied to it. The NCO 210 takes as an input a frequency value and outputs a constant magnitude complex signal with instantaneous frequency equal to the value of the input, e.g., exp(j*2pi*f*t), where f is the input frequency.

Figure 3:
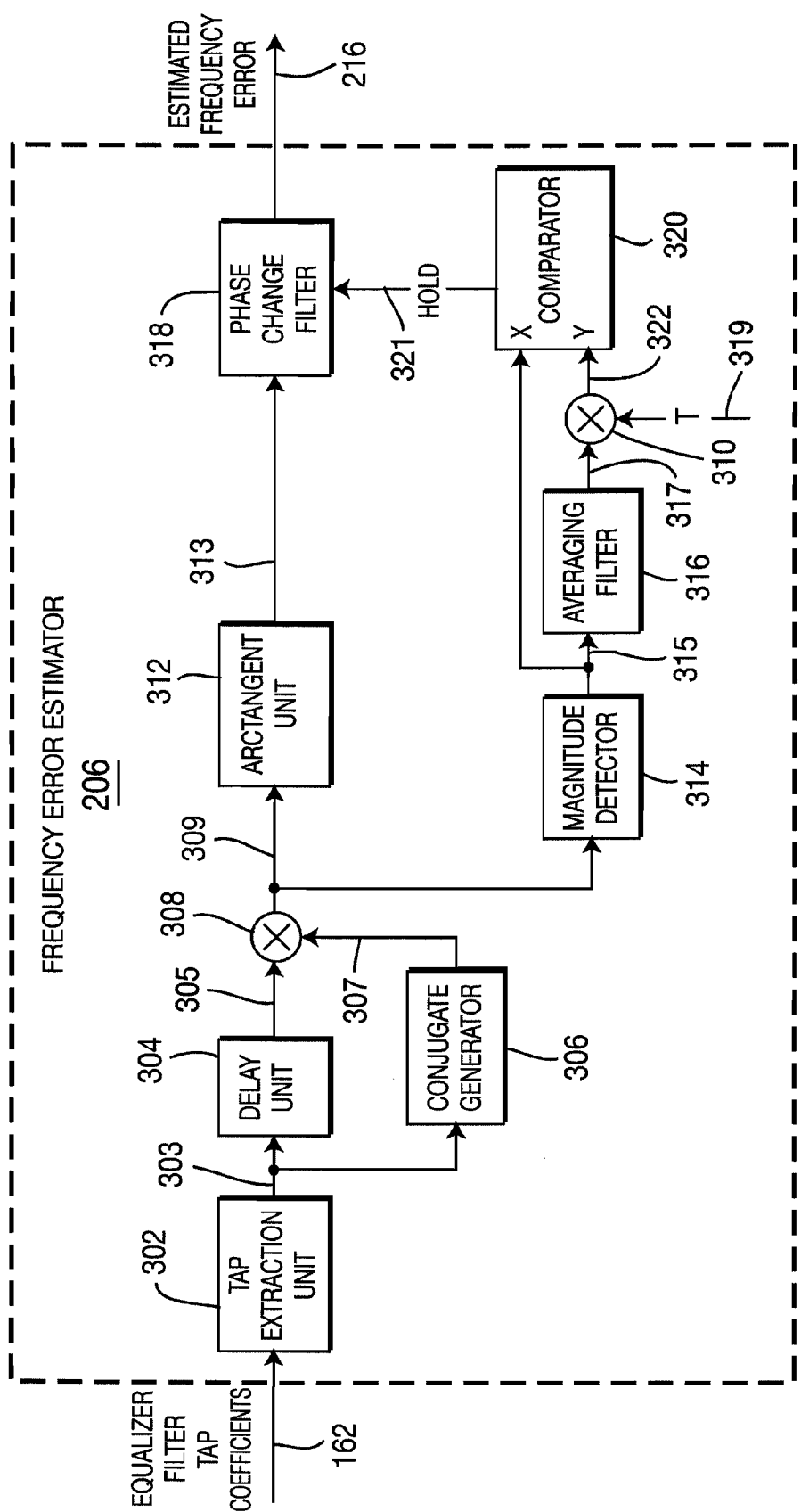
FIG. 3 is an exemplary block diagram of a frequency error estimator used in the BFC unit of FIG. 2.

FIG. 3 is a block diagram of the frequency error estimator 206 used in the BFC unit of FIG. 2. The frequency error estimator 206 includes a tap extraction unit 302, a delay unit 304, a conjugate generator 306, multipliers 308, 310, an arctangent unit 312, a magnitude detector 314, an averaging filter 316, a phase change filter 318 and a comparator 320. The equalizer tap update unit 134 in the NLMS equalizer 118 generates equalizer filter tap coefficients 162 which are supplied to the frequency error estimator 206.

In the frequency error estimator 206, the tap extraction unit 302 extracts and outputs an appropriate tap value or average of tap values onto an output signal 303 from the equalizer filter tap coefficients 162 (or alternatively, from a channel estimator) to use for performing frequency estimation. For example, at least one appropriate tap value corresponding to a first significant path (FSP) in a particular channel may be extracted from the equalizer filter tap coefficients 162. The tap extraction unit 302 may also track drifting of a large valued tap and select this tap as the extracted tap value.

The extracted tap value 303 is forwarded to the delay unit 304 and the conjugate unit 206. The delay unit 304 delays the extracted tap value 303 for a predetermined period of time by outputting a delayed tap value on 305. The conjugate generator is used to generate a conjugate 307 of the extracted tap value 303. The multiplier 308 multiplies the delayed tap value 305 by the conjugate tap value 307. The output 309 of the multiplier 308 has a phase value equal to the phase difference between the delayed tap value 305 and the conjugate tap value 307. This phase value is proportional to the average frequency of the signal 303 and therefore of the sample data stream 110.

The arctangent unit 312 measures an angle value 313 of the output 309 of the multiplier 308. The angle value 313 is equal to the phase difference between signal 305 and signal 307. Averaging the angle value 313 is therefore equivalent to averaging the phase difference between signal 305 and signal 307. The angle value 313 is filtered by the phase change filter 318 for averaging the angle value 313. The measured average phase difference and the known delay are used to generate the estimated frequency error signal 316.

For example, with a delay D (sec) and phase measured in radians, the gain of the frequency error estimator 206 is 1/(2*PI*D). The "gain" refers to the conversion of a signal with a net frequency error (as indicated by signal 110) to an observed value of the estimated frequency error signal 216. If the signal 110 has an average frequency of 1 Hz, then the output value on the estimated frequency error signal 216 will be 1(2*PI*D).

The magnitude detection unit 314 calculates the magnitude of the output 309 of the multiplier 308 and sends a calculated magnitude value 315 to a first input, X, of the comparator 320 and to the averaging filter 316 for averaging. The multiplier 310 multiplies the output signal 317 of the averaging filter 316 (i.e., the average value of signal 315) with a threshold factor value 319 (e.g., a scaling factor having a value T) to generate a threshold signal 322 which is sent to a second input, Y, of the comparator 320. The value of the threshold signal 322 may be set to a fraction of the average amplitude of the output 309 of the multiplier 308. The threshold factor value, T, may be set, for example, to ⅓. The comparator 320 compares the calculated magnitude value 315 with the value of the threshold signal 322 and sends a hold signal 321 to the phase change filter 318 if the calculated magnitude value 315 is below the value of the threshold signal 322.

The magnitude of the output 309 of the multiplier 308 may be measured and compared to a fraction of the average amplitude of the output 309 of the multiplier 308, whereby the phase change filter 318 is paused whenever the magnitude of the output 309 of the multiplier 308 drops below a threshold. When the filter 318 is paused, the estimated frequency error signal 216 does not change (i.e., the signal 216 is not updated), the input 313 is not used, and the internal state of the filter 318 does not change. The hold signal 321 is true whenever the signal 309 is relatively small. This has the effect of discarding the angle values on signal 313 whenever they are noisiest, and improving the estimated frequency error signal 216 when the channel undergoes deep fades.

Alternately, a power detector (not shown) may be substituted for the magnitude detector 314 to calculate the average power (i.e., the squared magnitude) of the output 309 of the multiplier 308, whereby the instantaneous power of the output 309 is compared to some fraction of the average power. Other variations are also possible.

The present invention controls the adaptation step-size of an adaptive equalizer. The value of the adaptation step-size $\mu$ depends on the rate of channel change (such as a Doppler spread which is related to the WTRU velocity), and SNR of the channel. For fast channels, it is preferable to use a larger step-size to allow the adaptive equalizer to track the channel variations quickly. Conversely, for slower channels, a lower step-size is desired to reduce the misadjustment error and thus improve the performance of the adaptive equalizer.

The dependency of the adaptation step-size parameter $\mu$ on the SNR is such that at a high SNR, the value of the adaptation step-size parameter $\mu$ tends to be higher, while at a low SNR, the adaptive step-size parameter $\mu$ is typically small. Additional inputs may also be used as appropriate (e.g., delay spread and the number of active taps in the equalizer filter). The present invention is used to maintain an ideal balance between the convergence speed and accuracy through the estimation of the apparent channel speed.

Figure 4:
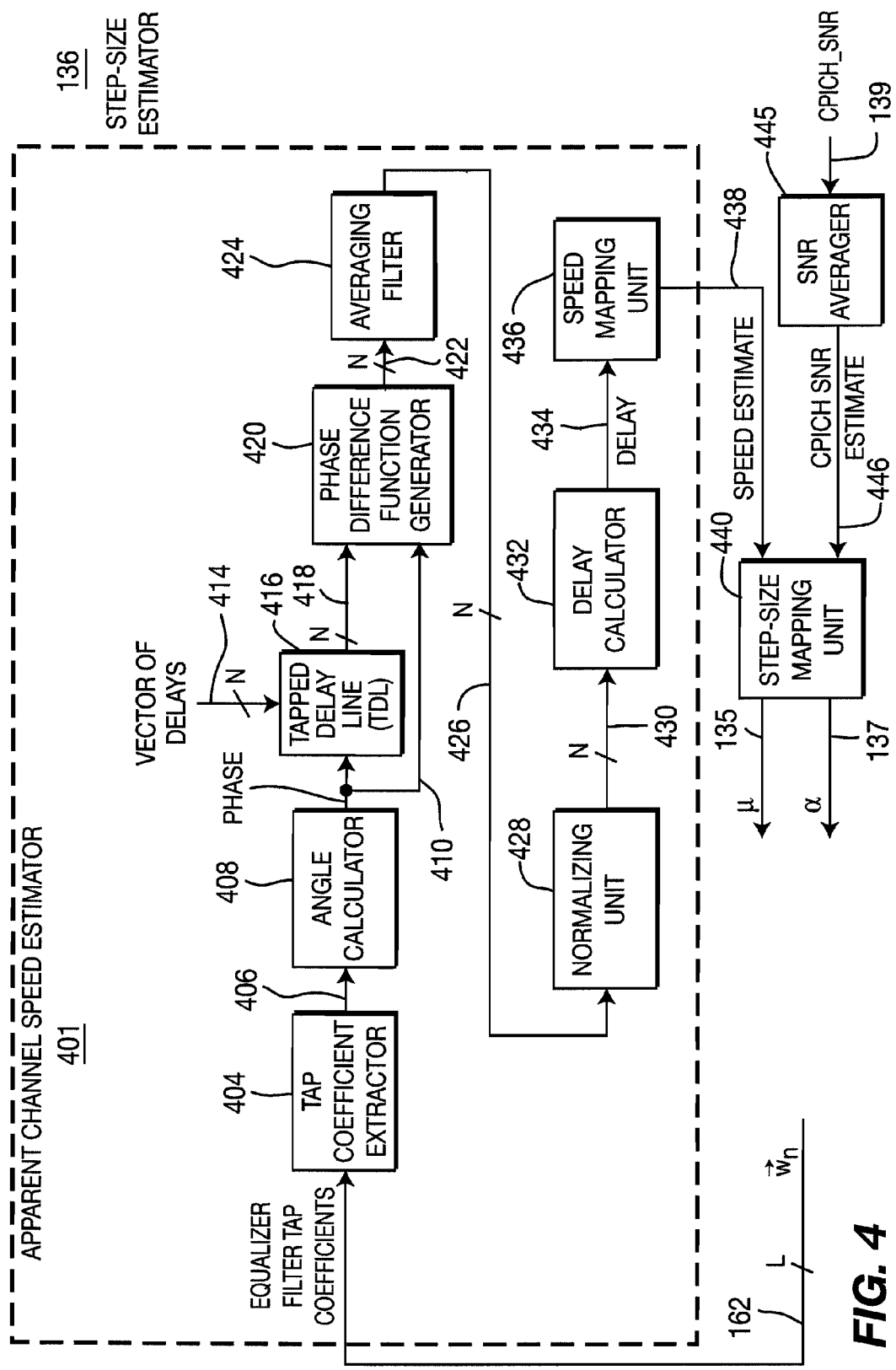
FIG. 4 is an exemplary block diagram of a step-size estimator including an apparent channel speed estimator used in the receiver of FIG. 1.

FIG. 4 is a block diagram of the step-size estimator 136 which includes an apparent channel speed estimator 401. The step-size estimator 136 includes an apparent channel speed estimator 401, a step-size mapping unit 440 and an SNR averager 445. The apparent channel speed estimator 401 estimates the speed of a channel established between a first transceiver which includes the step-size estimator 136, and a second transceiver. Equalizer filter tap coefficients 162 are input to the apparent channel speed estimator 401 by the equalizer tap update filter 134 shown in FIG. 1. The equalizer filter tap coefficients 162 are complex values that are multiplied with an input sample sequence in the equalizer 118. Each of the equalizer filter tap coefficients 162 output by the equalizer tap update unit 134 is generated by finding the inner product of two vectors. One vector is a state (output) of a tapped delay line (TDL) within the equalizer tap update unit 134, and the other vector is the vector of equalizer filter tap coefficients 162 (or a conjugate of them) used by the equalizer tap update unit 134.

Referring to FIG. 4, the apparent channel speed estimator 401 includes a tap coefficient extractor 404, an angle calculator 408, a TDL 416, a phase difference function generator 420, an averaging filter 424, a normalizing unit 428, a delay calculator 432 and a speed mapping unit 436.

In accordance with the present invention, velocity information is extracted from a history of the filter coefficients used by the equalizer tap update unit 134. This procedure is possible because the equalizer tap update unit 134 adaptively estimates a minimum mean square error (MMSE) solution to detect a reference signal such as a pilot signal. In doing so, the resulting equalizer tap update unit 134 is close to an inverse of the channel. A speed estimate may be performed by tracking the rate of change of one or more filter tap values used by the equalizer tap update unit 134 which reflect the rate of change of the channel (i.e., its apparent speed).

The tap coefficient extractor 404 extracts at least one tap coefficient from equalizer filter tap coefficients 162 received from the equalizer tap update unit 134 and sends the extracted tap coefficient 406 to the angle calculator 408.

A typical channel impulse response can usually be characterized by finite set of (disjoint) delayed and scaled impulses. The location of each of these impulses is referred to as a path (i.e., a component of a "multi-path" channel). The location and the mean power of each of the paths relative to an FSP determine the location and magnitude of the equalizer tap weights.

The extracted tap coefficient 406 may be a coefficient that corresponds to an FSP, a most significant path (MSP), an average of several taps, or any other paths. The extracted tap coefficient 406 consists of complex numbers, and thus has an amplitude and a phase (or equivalently, an angle value). The angle calculator 408 outputs the phase 410 of the extracted tap coefficient 406 to both the TDL 416 and the phase difference function generator 420.

The full length of the TDL 416 may be larger than N (i.e., not all delays will necessarily have taps). The length of the TDL 416 must be at least D(N), which corresponds to the tap having the longest delay from the input of the TDL 416. The delay from the input of the TDL 416 to the output n (0<n<N+1) will be D(n). The TDL 416 shifts data from the input through the next delay element on a first clock tick and on to the next delay element on subsequent clock ticks. The TDL 416 operates in a similar manner as a shift register.

A vector of delays 414, D(k), comprising N delay values D(1) . . . D(N), is input into the TDL 416. The TDL 416 generates N delayed samples 418, X(i−D(k)), k=1 . . . N, in accordance with the vector of delays 414 and the phase 410 of the extracted tap coefficient 406. The index variable "i" is used as a time index and is suppressed in the sequel.

The phase difference function generator 420 generates N samples of an auto-correlation-like phase difference function based on each of the N delayed samples 418 output by the TDL 416 and the phase 410 output by the angle calculator 408. More specifically, N phase difference function values 422 are generated, one for each element of the vector of delays 414. The preferred function is |pi−|phase(1)−phase(n)||, where |x|=absolute value of x, but other such functions can be used.

The averaging filter 424 averages the magnitude of the N phase difference function values 422 to generate an average phase difference function vector 426 having a plurality of elements, avg_phase_dif(k), k=1 . . . N. The averaging filter 424 is essentially a bank of fixed low-pass filters, such as a moving average filter or a simple infinite impulse response (IIR) filter.

The normalizing unit 428 normalizes the elements of the average phase difference function vector 426 to generate a normalized phase difference function vector 430 having a plurality of elements. The measurements are normalized to a measured function value at a small delay. The first element in the average phase difference function vector 426 is used to divide all of the elements of the average phase difference function vector 426 to complete the normalization process. The first element in the average phase difference function vector 426 corresponds to the smallest delay in the TDL 416. It is chosen specifically to have a delay small enough such that any phase difference between the phase 410 and the first element of the N delayed samples 418 are due only to noise and not due to changes in the channel in order to compensate for random phase changes due to noise.

For example, the normalization is performed by dividing each element of the average phase difference vector 426 with the first element as follows: norm_phase_dif(k)=avg_phase_dif(k)/avg_phase_dif(1), k=1 . . . N, where avg_phase_dif is the vector of averaged phase difference function values.

Each element of the normalized phase difference function vector 430 is then compared to a threshold by a delay calculator 432 to generate a delay at a threshold. The normalized phase difference function vector 430 is a vector of decreasing numbers (at least the first two) starting with 1.0 that correspond to samples of a curve that is also decreasing (at least near the origin).

The goal of the delay calculator 432 is to estimate the distance (in time/delay) at which the curve crosses the value equal to the threshold. If the threshold is greater than the smallest value in the normalized phase difference function vector 430, then the estimate is performed using linear interpolation. If the threshold is less than the smallest value in the normalized phase difference function vector 430, then the estimate is performed using linear extrapolation.

The threshold delay 434 is mapped to a speed estimate 438 by the speed mapping unit 436 in accordance with a predefined mapping function. The SNR averager 445 in the step-size estimator 136 generates a CPICH SNR estimate 446 based on a CPICH_SNR input 139 and sends the CPICH SNR estimate 446 to the step-size mapping unit 440. The speed estimate 438 and the CPICH SNR estimate 446 are then mapped by the step-size mapping unit 440 to the step-size, $\mu$, parameter 135 and the filter taps leakage factor, $\alpha$, parameter 137 for the equalizer tap update unit 134.

The mapping from speed and SNR is determined empirically. This is implemented by simulating the performance of the receiver with various values of the step-size, $\mu$ ("mu"), parameter 135, and the filter taps leakage factor, $\alpha$ ("alpha"), parameter 137 for various speeds and SNRs. At each speed and SNR value, the values of $\mu$ and $\alpha$ are determined by selecting those values which optimize performance (e.g., lowest BER or highest throughput). Once the relation between (speed, SNR) and $\{\mu, \alpha\}$ is determined for the simulated points, a more general function can be found by conventional two-dimensional (2-D) curve fitting techniques. Once the equations are established, the mapping procedure may be implemented by directly implementing the equations (or approximations of them), referring to a look up table (LUT), or both.

The filter taps leakage factor, $\alpha$, is defined as follows:

$$0 < \alpha \leq 1, \qquad \text{Equation (8)}$$

where $\alpha=1$ indicates that there is no taps leakage. When it is not desired to calculate the filter taps leakage factor, $\alpha$ (i.e., it is "optional"), $\alpha$ is just set to 1. Based on the speed estimate 438 and the CPICH SNR estimate 446, the $\mu$ parameter 135 and the $\alpha$ parameter 137 are selected.

The adaptation of the filter coefficients in a generic LMS algorithm can be written as:

$$\vec{w}_{n+1} = \alpha \cdot \vec{w}_n + \mu \cdot \vec{e}_n, \qquad \text{Equation (9)}$$

where the vector $\vec{w}_n$ represents the current value of the filter coefficients used by the equalizer tap update unit 134, $\vec{w}_{n+1}$ represents the new value of the filter coefficients used by the equalizer tap update unit 134, and the vector $\vec{e}_n$ represents the error signal that is generated as part of the LMS algorithm of the equalizer tap update unit 134. The equalizer tap update unit 134 generates the equalizer filter tap coefficients 162, each of which is a vector signal with L elements, where L is equal to the number of taps.

Figure 5:
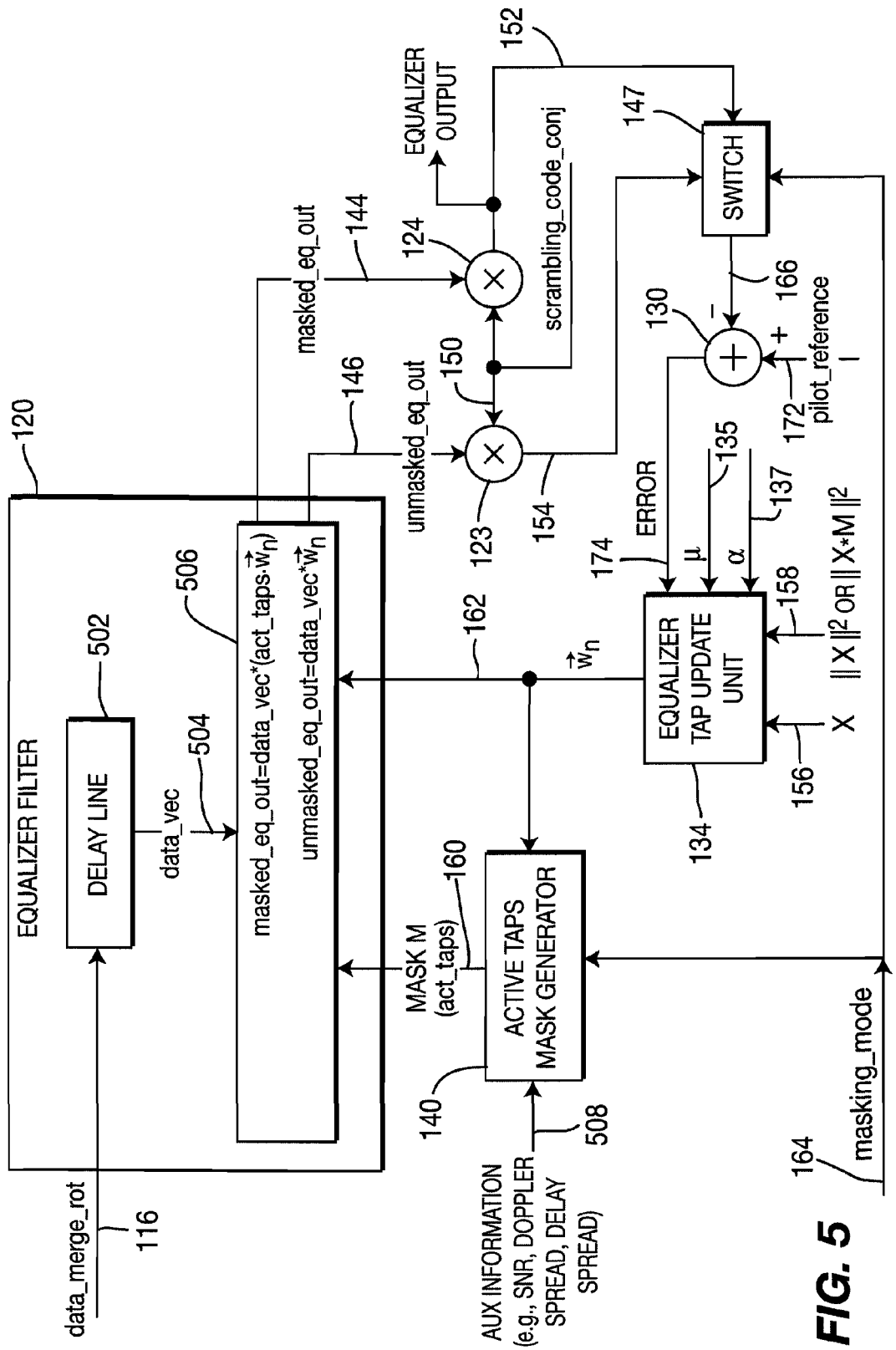
FIG. 5 is a high-level block diagram depicting the integration of an active taps mask generator within the NLMS CLE receiver of FIG. 1.

FIG. 5 is a high-level block diagram depicting the integration of the active taps mask generator 140 within the NLMS CLE receiver 100. The equalizer filter 120 includes a delay line (e.g., TDL) 502 and a processing unit 506. A frequency corrected sample data stream 116 (data_merge_rot) enters the delay line 502 of the equalizer filter 120. Sampling the data in the delay line 502 at the desired sampling rate creates a data vector 504, (data_vec). The processing unit 506 is used to calculate the inner product between the output (data_vec) 504 of the delay line 502 and either one of the (unmasked) equalizer filter tap coefficients 162, $\vec{w}_n$, generated by the equalizer tap update unit 134, or the active taps mask vector 160 generated by the active taps mask generator 140 (act_taps×$\vec{w}_n$).

FIG. 5 shows that the equalizer filter 120 outputs a masked equalizer output signal 144 and an unmasked equalizer output signal 146. The masked equalizer output signal 144 is a chip rate signal that is multiplied with a scrambling code conjugate (scrambling_code_conj) signal 150 via the multiplier 124 to generate a descrambled masked equalizer output signal 152 (i.e., an estimate of the unscrambled transmitted chips) which is fed to a first input of the switch 147. The unmasked equalizer output signal 146 is multiplied with the scrambling code conjugate signal 150 via the multiplier 123 to generate a descrambled unmasked equalizer output signal 154 which is fed to a second input of the switch 147.

When an active mask algorithm is running in the active taps mask generator 140, the descrambled unmasked equalizer output signal 154 is used as the selected output signal 166 so that all taps are updated as if there was no mask. Thus, the active taps algorithm can examine all taps as they are updated such that it can be determined which taps should be masked or unmasked. When the active mask algorithm is inactive (e.g., in a hold state), then it is preferred to use the signal corresponding to the masked output of the equalizer such that the error signal 174 reflects only the active taps. The masking mode signal 164 controls the switch 147 such that the descrambled masked equalizer output signal 152 is selected as the signal 166 when the active taps algorithm of the active taps mask generator 140 is running, and the descrambled unmasked equalizer output signal 154 is selected as the signal 166 when the active taps algorithm of the active taps mask generator 140 is held.

The unmasked equalizer output signal 146 is a vector-vector inner product of the data vector 504 and is represented by a tap update Equation (10) as follows:

$$\text{unmasked\_eq\_out} = \text{data\_vec} * \vec{w}_n, \qquad \text{Equation (10)}$$

where data_vec is the data vector 504 generated by the delay line 502, $\vec{w}_n$ is the values of the equalizer filter tap coefficients 162 generated by the equalizer tap update unit 134 and (*) indicates a vector-vector inner product. The masked equalizer output signal 144 is also a vector-vector inner product of the data vector 504 and is represented by a tap update Equation (11) as follows:

$$\text{masked\_eq\_out} = \text{data\_vec} * (\text{act\_taps} \cdot \vec{w}_n), \quad \text{Equation (11)}$$

where act_taps is a vector used to mask the values of the equalizer filter tap coefficients 162, (*) indicates a vector-vector inner product and (·) indicates a vector-vector element wise product. The mask vector is used to eliminate or decrease the contribution of taps elements that are believed to be more detrimental to the quality of the output than if they were used. By the equalizer filter 120 generating two separate equalizer output signals 144, 146, the taps may be monitored while they are not in use.

The active taps mask vector 160 may be generated in several ways. In a simple approach, the magnitudes of the tap weights are compared to a threshold. If the value is greater than the threshold, the corresponding element in the active taps mask vector 160 is set to 1, otherwise 0. The mask vector elements may also be set to deemphasize certain taps elements rather than turn them off completely. In that case, the active taps mask vector 160 takes on values that can range anywhere from 0 to 1. The value may be changed gradually rather than abruptly.

Additional information 508, such as SNR, Doppler spread or delay spread, may also be used in setting the mask values. For example, if a delay spread is known to be small, the total number of non-zero elements can be limited.

The threshold values can be fixed or determined by first making a time-average of the tap magnitude(s) (or other distance metric), and using this information to set the threshold(s). If no hysteresis is desired, only one threshold is needed. With hysteresis, at least two thresholds are needed, an upper and a lower. When a tap element exceeds the upper threshold, the corresponding mask element is set to '1' or allowed to increase towards '1'. If a tap element goes below the lower threshold, the corresponding mask element is set to '0' or allowed to decrease towards '0'.

The threshold values can also be influenced by additional information, such as Doppler spread. For example, if the Doppler spread is known to be large, the adaptive equalizer will have larger tracking and misadjustment errors and so it may be desirable to raise the threshold(s).

The active taps mask generator 140 is controlled by an enable/disable parameter used to set the masking mode signal 164. The active taps mask generator 140 controls the number and position of active taps in the equalizer filter 120 when in either the static filter tap masking mode or the dynamic filter tap masking mode. In the static filter tap masking mode, a fixed mask vector is generated and used to mask the taps (i.e., zero the taps) accordingly. In the dynamic filter tap masking mode, the masked equalizer output signal 144 is used for generating the equalizer filter tap coefficients 162. In the dynamic filter tap masking mode, a dynamic mask vector is generated and used to mask the taps. In the static filter tap masking mode, the unmasked equalizer output signal 146 is used for generating the equalizer filter tap coefficients 162.

Referring to FIG. 5, the selection between the static and dynamic filter tap masking modes is determined by the position of a switch 147, which is controlled by the masking mode signal 164. As previously described with respect to FIG. 1, when the masking mode signal 164 indicates that the static filter tap masking mode is being used, the switch 147 selects the descrambled masked equalizer output signal 152 as a selected output signal 166 to be fed to the adder 130. When the masking mode signal 164 indicates that the dynamic filter tap masking mode is being used, the switch 147 selects the descrambled unmasked equalizer output signal 154 as the selected output signal 166. In the dynamic filter tap masking mode, the filter taps are monitored and taps to be masked are selected, whereby the active taps mask vector 160 is generated accordingly by the active taps mask generator 140.

Figure 6:
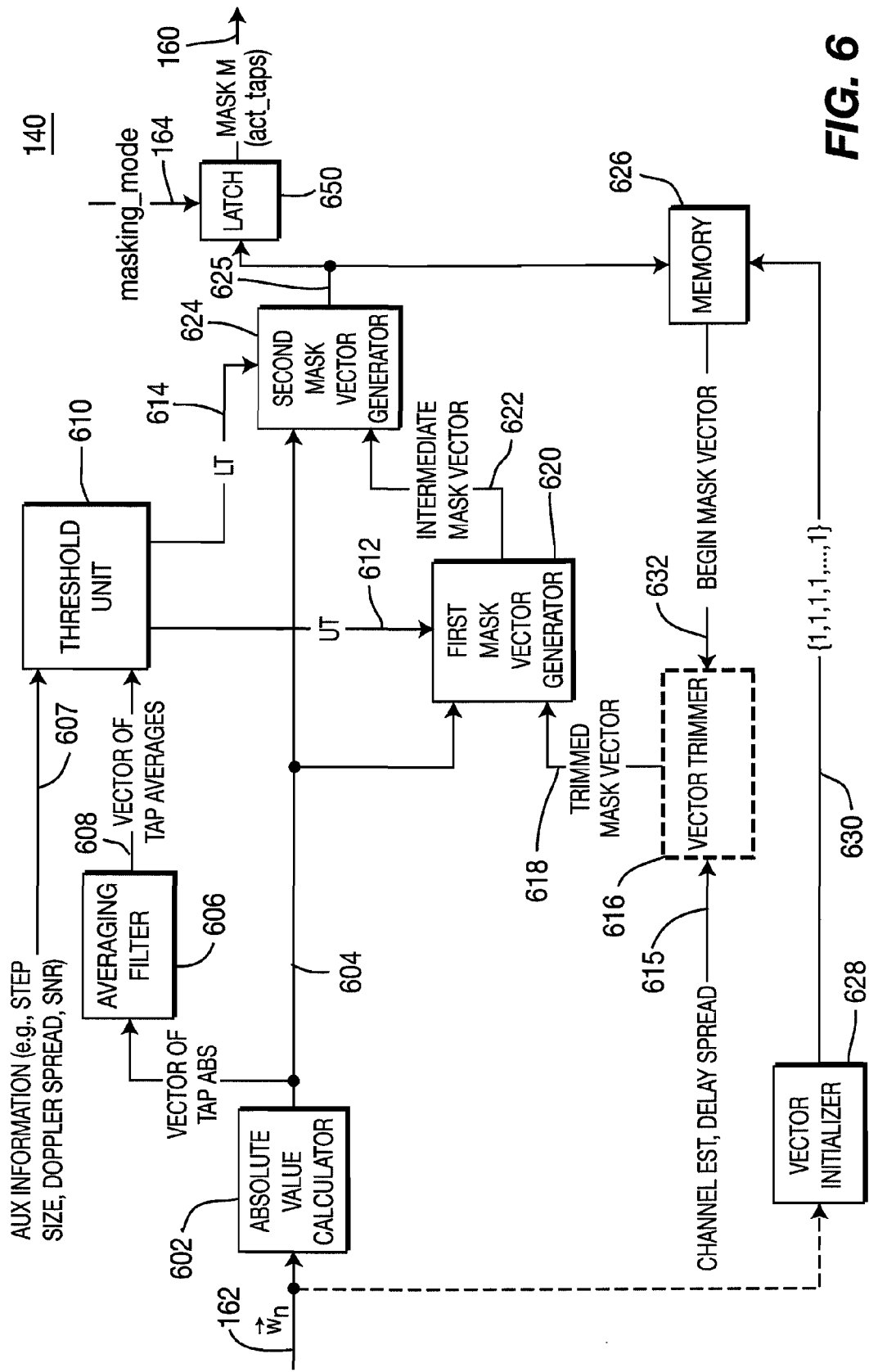
FIG. 6 is a detailed block diagram of the active taps mask generator of FIG. 5.

FIG. 6 is a block diagram of an exemplary active taps mask generator 140 in accordance with the present invention. The equalizer filter tap coefficients 162 generated by the equalizer tap update unit 134 are input to the active taps mask generator 140. The absolute value (or some other distance measure) is computed on each of (or a subset of) the elements of the equalizer filter tap coefficients 162 by an absolute value calculator 602. The absolute value calculator 602 outputs a vector of tap absolute values (ABS) 604. Averaging is performed by an averaging filter 606 on each of the elements of the vector of tap ABS 604 to generate the vector of tap averages 608.

An upper threshold (UT) 612 and a lower threshold (LT) 614 are generated by a threshold unit 610 based on the vector of tap averages 608 (the UT and LT, respectively). The UT 612 and the LT 614 may be set as a fraction (i.e., a percentage) of the average of all elements in the vector of tap averages 608, as a fraction of the largest element(s) or some other function. Additional optional information 607, (such as step-size, Doppler spread or SNR), may be used for setting at least one of the LT and the UT.

The UT 612 is fed to a first mask vector generator 620 and the LT 614 is fed to a second mask vector generator 624. The vector of tap ABS 604 is also fed to the first mask vector generator 620 and the second mask vector generator 624.

A mask vector stored in a memory 626 becomes a begin mask vector 632 for active taps estimation. A vector initializer 628 generates all '1's vector 630 in the same length as the equalizer filter tap coefficients 162 to be stored in the memory 626. The begin mask vector 632 is forwarded from the memory 626 to the first mask vector generator 620 directly or alternatively as a trimmed mask vector 618 after being trimmed by a vector trimmer 616.

The elements of the begin mask vector 632 may be zeroed by the vector trimmer 616 at one or both ends in accordance with additional information 615 (such as channel estimation or channel delay spread). For example, if the channel delay spread is small, the begin mask vector 632 may be trimmed by zeroing out one or both ends of the begin mask vector 632.

The first mask vector generator 620 sets an element in the begin mask vector 632 (or alternatively, the trimmed mask vector 618) to '1' if the corresponding element in the vector of tap ABS 604 is above the UT. The first mask vector generator 620 then outputs an intermediate mask vector 622.

Still referring to FIG. 6, a second mask vector generator 624 sets an element in the intermediate mask vector 622 to '0' if the corresponding element in the vector of tap ABS 604 is below the LT 614 to generate an active taps mask vector 625. The active taps mask vector 625 is stored in the memory 626 for next iteration. A latch 650, controlled by the masking mode signal 164, determines whether the static or dynamic filter tap masking mode is to be used such that a mask M is made available to the equalizer filter 120 and the vector norm square estimator 132. When the masking mode signal 164 indicates that the static filter tap masking mode is to be implemented, the latch 650 latches (i.e., holds) the values of the active taps mask vector 625 constant at the value it had at the time when the masking mode becomes static. When the masking mode signal 164 indicates that the dynamic filter tap masking mode is to be implemented, the active taps mask vector 625 is passed through the latch 650 to provide active taps mask vector signal 160 to the equalizer filter 120 and the vector norm square estimator 132.

Referring back to FIG. 1, the equalizer filter tap coefficients 162 are derived by comparing the selected output signal 166 to the pilot reference signal 172. Since the selected output signal 166 contains a plurality of superimposed components, only one of which corresponds to the pilot signal, the NLMS algorithm does not directly control the equalizer output power. Thus, several factors contribute to making the fixed-point design requirements of the filter and despreader implementation demanding beyond usual issues associated with the fading channels. Among these are large possible span of pilot power to total power transmission and the large possible span of per-code data power to total power transmission. The amplitude of the pilot reference signal 172 can be set somewhat arbitrarily in a floating-point environment. However, when fixed-point issues are considered, the amplitude setting can be important. The fixed-point issues arise in the equalizer filter itself and also in the subsequent de-spreaders.

The present invention also provides a means to control the reference signal amplitude in such a way as to minimize the fixed-point requirements of the equalizer filter, de-spreaders, or a combination of both. Moreover, the present invention also provides a means to eliminate the need for a constellation scaling procedure when quadrature amplitude modulation (QAM) is employed.

The average power at the equalizer filter output depends on the ratio of the pilot power to the total transmitted power and the pilot reference amplitude. As a by-product in the NLMS equalizer, the relationship between the total input power and the locally created pilot power levels through the process may be used to estimate the CPICH energy per chip (Ec) divided by the total input power (Io), Ec/Io, that can be used as the strength indicator for the serving cell power level. A WTRU that uses the above-mentioned equalization method does not require additional hardware, software and complexity to estimate serving cell CPICH SINR. The periodic neighbor cell measurements will be partially simplified since the serving cell CPICH SINR will be available with simple power calculations. In a normal deployment scenario, the ratio of the data portion of the signal to the pilot portion of the signal is allowed to vary. Therefore, the full dynamic range of the signal at the output of the equalizer filter also varies. Furthermore, in CDMA systems, the despreaders also have to contend with these variations in addition to the variations caused by changes in the number of used codes. The present invention provides a means to reduce the dynamic range of the signal at the equalizer filter output.

The pilot amplitude reference unit 142 in FIG. 1 controls the reference signal amplitude and therefore the output power of the equalizer filter 120 so as to alleviate the fixed-point requirements. In accordance with one embodiment of the present invention, the estimated filter input power and tap weights are used to estimate the output power. The estimated output power is used to adjust the pilot reference amplitude signal 168 so that the NLMS CLE receiver 100 naturally adjusts the tap weights to bring the power level into the desired range.

Figure 7:
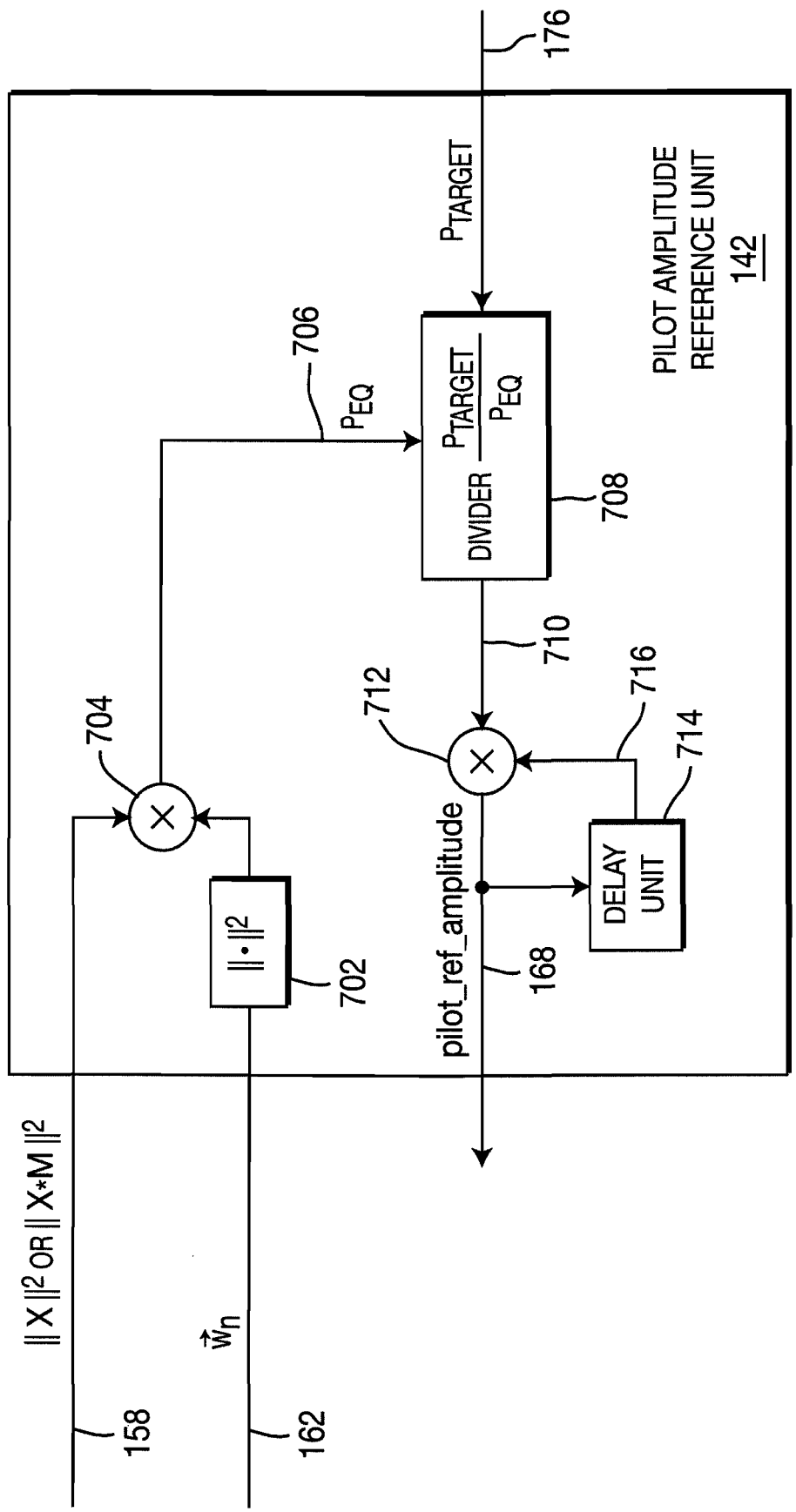
FIG. 7 is a detailed block diagram depicting the integration of a pilot amplitude reference unit in the NLMS CLE receiver of FIG. 1.

FIG. 7 is a high-level block diagram depicting the integration of the pilot amplitude reference unit 142 in the NLMS CLE receiver 100 of FIG. 1 to minimize the dynamic range of the equalizer filter 120 in accordance with the present invention. The pilot amplitude reference unit 142 receives the vector normalization signal 158 and the equalizer filter tap coefficients 162. A vector norm square unit 702 performs a vector norm square function on the equalizer filter tap coefficients 162 and outputs the result to a first input of a multiplier 704. The vector normalization signal 158 is fed to a second input of the multiplier 704. The multiplier 704 multiplies the output of the vector norm square unit with the vector normalization signal 158 to generate an equalizer output power signal 706 having a value of $P_{EQ}$.

As shown in FIG. 7, the pilot amplitude reference unit 142 is used to control the amplitude of the pilot reference amplitude signal 168 in a closed loop manner. The value $P_{TARGET}$ of a target power measurement signal 176 is divided by the value $P_{EQ}$ of the equalizer output power signal 706 by a divider 708 to generate a quotient result measurement signal 710 having a value $P_{TARGET}/P_{EQ}$. The quotient result measurement signal 710 is filtered by a loop filter comprising a multiplier 712 and a delay unit 714, whereby the multiplier 712 multiplies the output 716 of the delay unit 714 by the quotient result measurement signal 710 to generate the pilot reference amplitude signal 168.

The dynamic output range of the equalizer 120 is adjusted based on a power ratio measurement. The pilot amplitude reference unit 142 receives an equalizer filter output and calculates a ratio of pilot power to the total power, Pilot-Power/TotalPower. The pilot amplitude reference unit 142 then generates a pilot reference amplitude signal 168 based on the ratio which is multiplied with a scaled pilot (i.e., CPICH) channelization code 170 by a multiplier 128 to generate a pilot reference signal 172. In this way, the dynamic range of the equalizer filter 120 output is minimized. Referring to FIG. 1, the pilot amplitude reference unit 142 feeds the equalizer tap update unit 134 via the multiplier 128 and adder 130. The equalizer tap update unit 134 then provides equalizer filter tap coefficients 162 to the equalizer filter 120. If the output power of the equalizer filter 120 increases, it will be detected by the pilot amplitude reference unit 142 and will respond by decreasing the amplitude of the pilot reference signal 172. This will in turn cause the tap update unit 134 to generate smaller taps and thus reduce the output power of the equalizer filter 120.

Figure 8:
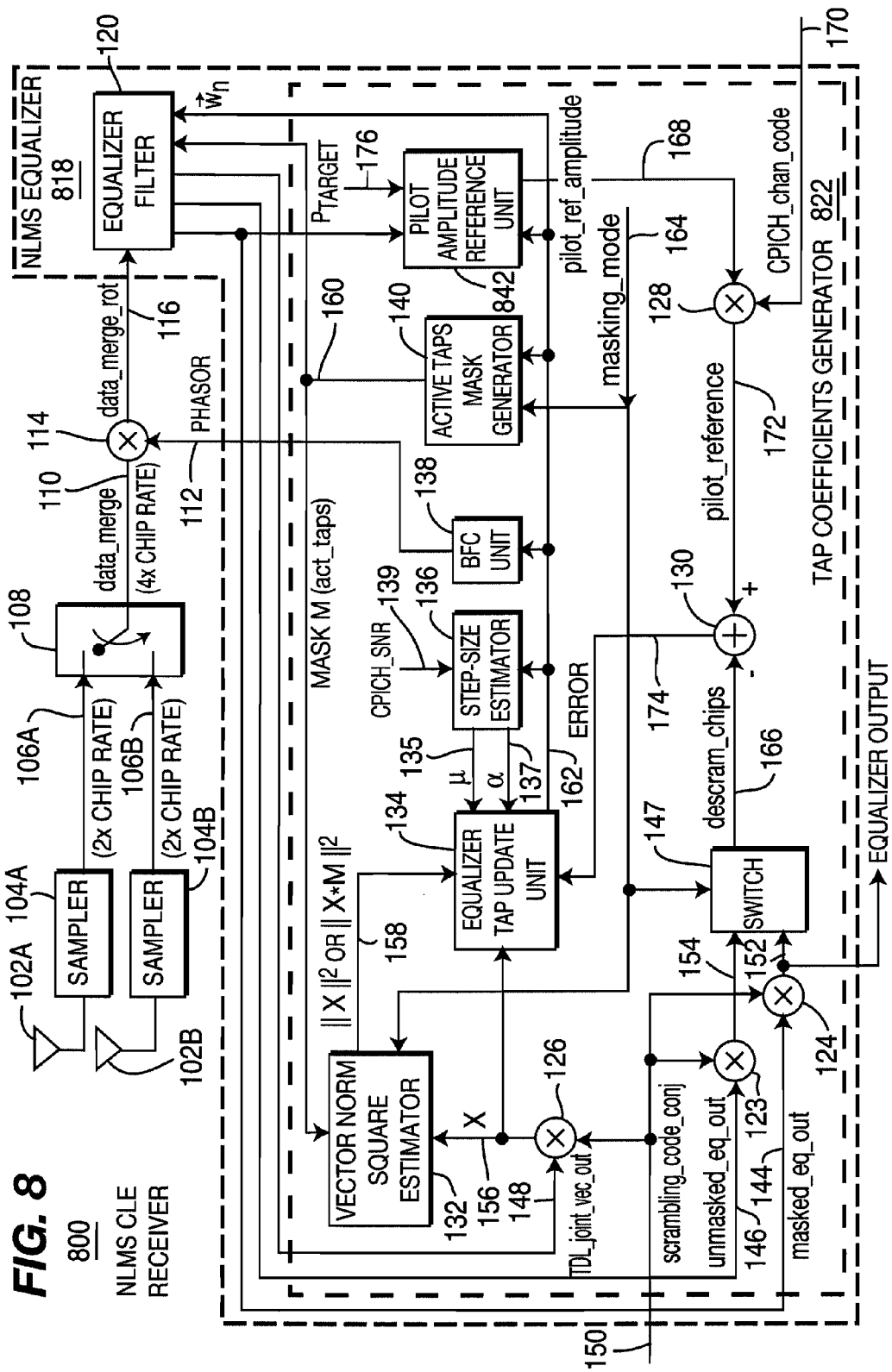
FIG. 8 is a high-level block diagram of an exemplary NLMS CLE receiver configured in accordance with another embodiment of the present invention.

FIG. 8 is a high-level block diagram of an exemplary NLMS CLE receiver 800 configured in accordance with another embodiment of the present invention. The NLMS CLE receiver 800 is a joint processing NLMS receiver which uses a single adaptive equalizer filter 120. The NLMS CLE receiver 800 includes a plurality of antennas 102A, 102B, a plurality of samplers 104A, 104B, a multiplexer 108, a multiplier 114 and an NLMS equalizer 818. The NLMS equalizer 818 includes the equalizer filter 120 and a tap coefficients generator 822.

The NLMS CLE receiver 800 of FIG. 8 is different from the NLMS CLE receiver 100 of FIG. 1 in that the receiver 800 includes a pilot amplitude reference unit 842 which receives the masked equalizer output signal 144 directly from the equalizer filter, rather than receiving the normalized signal 158 from the vector norm square estimator 132.

Figure 9:
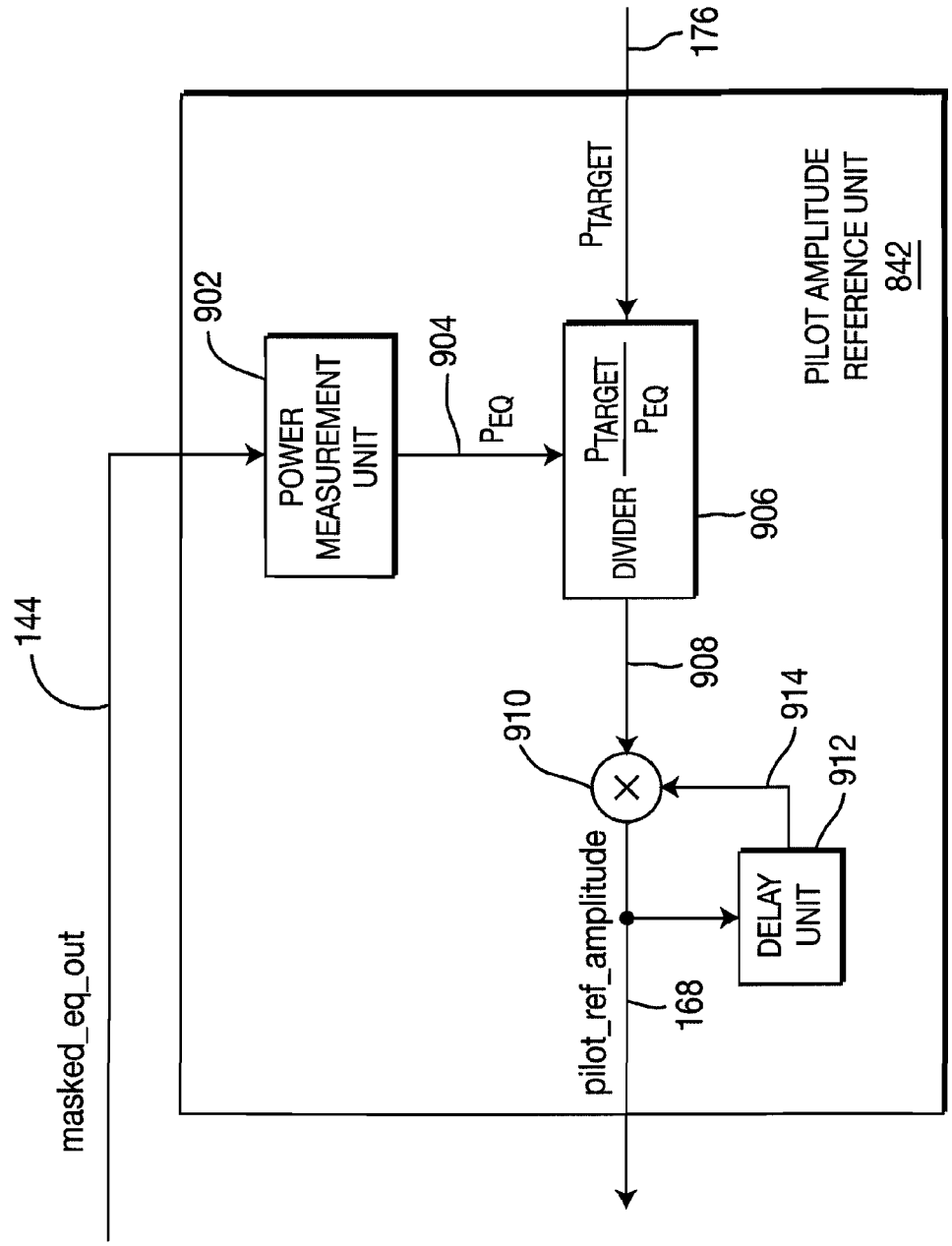
FIG. 9 is a detailed block diagram depicting the integration of a pilot amplitude reference unit in the NLMS CLE receiver of FIG. 8.

FIG. 9 is a detailed block diagram depicting the integration of the pilot amplitude reference unit 842 in the NLMS CLE receiver 800 of FIG. 8. Power or other measurements are performed on the masked equalizer output signal 144, which is a pilot-trained adaptive equalizer, by a power measurement unit 902 to generate an equalizer output power measurement signal 904 having a value of $P_{EQ}$. For example, power of the masked equalizer output signal 144 may be estimated in the power measurement unit 902 based on the following Equation (12):

$$P_{EQ}=(1-F_p)*|x|^2+F_p*P_{EQ}.$$ Equation (12)

where x is the amplitude of the masked equalizer output signal 144, $P_{EQ}$ is the value of the equalizer output power measurement signal 904, and $F_p$ is a filter parameter between 0.0 and 1.0.

As shown in FIG. 9, the pilot amplitude reference unit 842 is used to control the amplitude of the pilot reference amplitude signal 168 in a closed loop manner. The value $P_{TARGET}$ of a target power measurement signal 176 is divided by the value $P_{EQ}$ of the equalizer output power measurement signal 904 by a divider 906 to generate a quotient result measurement signal 908 having a value $P_{TARGET}/P_{EQ}$. The quotient result measurement signal 908 is filtered by a loop filter comprising a multiplier 910 and a delay unit 912, whereby the multiplier 910 multiplies the output 914 of the delay unit 714 with the quotient result measurement signal 908 to generate the pilot reference amplitude signal 168.

With respect to the despreaders, the despreader dynamic range may be optimized based on measurements. A ratio of pilot power to total power for an intended WTRU is estimated. The number of codes used is then estimated or obtained. The reference amplitude is then adjusted by a factor based on these parameters (e.g., sqrt(NumCodes*PilotPower/TotalPower)/SF), where SF is the spreading factor (i.e., the number of chips used to spread each symbol) and NumCodes is the number of codes used to spread HS-DSCH data intended to be received by the equalizer receiver. In this way the dynamic range is minimized for the despreaders and (if accurate enough) can eliminate the need for constellation scaling.

Alternatively, the despreader dynamic range may be optimized based on constellation scaling feedback. A scaling factor generated by constellation scaling may be used as feedback to control the reference amplitude and maintain a specified (e.g., unity power) symbol constellation.

Although the features and elements of the present invention are described in the preferred embodiments in particular combinations, each feature or element can be used alone without the other features and elements, or in various other combinations with or without other features and elements of the present invention.

What is claimed is:

1. A method for adaptive equalization comprising:
an equalizer filter outputting a masked equalizer signal and an unmasked equalizer signal using equalizer filter tap coefficients;
selecting one of the masked or unmasked equalizer signals;
based on the selected equalizer signal, generating an error signal that is used for updating the equalizer filter tap coefficients used by the equalizer filter; and
providing an active taps mask for the equalizer filter that is dependent on which equalizer signal is selected to generate the error signal such that a dynamic mask vector is used to mask active taps when the unmasked equalizer signal is used to generate the error signal, and a fixed mask vector is used to mask active taps when the masked equalizer signal is used to generate the error signal.

2. The method of claim 1 further comprising:
measuring a power of the masked equalizer signal;
generating an equalizer output power signal based on the power of the masked equalizer signal; and
dividing a power target measurement signal by the value of the equalizer output power signal to generate a quotient result measurement signal, wherein a reference amplitude signal is based on the quotient result measurement signal.

3. The method of claim 2 further comprising:
estimating a serving cell signal strength based on the quotient result measurement signal.

4. A method for adaptive equalization comprising:
an equalizer filter outputting a masked equalizer signal and an unmasked equalizer signal using equalizer filter tap coefficients;
selecting one of the masked or unmasked equalizer signals;
based on the selected equalizer signal, generating an error signal that is used for updating the equalizer filter tap coefficients used by the equalizer filter;
providing an active taps mask for the equalizer filter that is dependent on which equalizer signal is selected to generate the error signal;
a pilot amplitude reference unit generating a reference amplitude signal used to adjust an output power;
generating a pilot reference signal by multiplying the reference amplitude signal with a scaled pilot channelization code signal; and
generating the error signal by subtracting the selected equalizer signal from the pilot reference signal.

5. The method of claim 4 wherein the scaled pilot channelization code signal is a common pilot channel (CPICH) channelization code signal.

6. The method of claim 4 further comprising:
descrambling an equalizer tapped delay line (TDL) signal that is output from the equalizer filter.

7. The method of claim 6 further comprising:
generating a normalization signal having a value based on the descrambled equalizer TDL signal.

8. The method of claim 7 further comprising:
performing a vector norm square function on the equalizer filter tap coefficients;
generating a vector norm square output signal based on the performing the vector norm square function;
multiplying the vector norm square output signal with the normalization signal to generate an equalizer output power signal; and
dividing a power target measurement signal by the value of the equalizer output power signal to generate a quotient result measurement signal, wherein the reference amplitude signal is based on the quotient result measurement signal.

9. A method for adaptive equalization comprising:
an equalizer filter outputting a masked equalizer signal and an unmasked equalizer signal using equalizer filter tap coefficients;
selecting one of the masked or unmasked equalizer signals;
based on the selected equalizer signal and a reference amplitude signal, generating an error signal that is used for updating equalizer filter tap coefficients used by the equalizer filter;
providing an active taps mask for the equalizer filter that is dependent on which equalizer signal is selected to generate the error signal;
measuring a power of the masked equalizer signal;
generating an equalizer output power signal based on the power of the masked equalizer signal;
dividing a power target measurement signal by the value of the equalizer output power signal to generate a quotient result measurement signal wherein the reference amplitude signal is based on the quotient result measurement signal;
outputting an equalizer tapped delay line (TDL) signal from the equalizer filter; and
descrambling the equalizer TDL signal.

10. The method of claim 9 further comprising:
generating a normalization signal having a value equal to the norm squared of the value of the descrambled TDL signal.

* * * * *